United States Patent [19]

Brau et al.

[11] 4,323,857
[45] Apr. 6, 1982

[54] CATALAC FREE ELECTRON LASER

[75] Inventors: Charles A. Brau; Donald A. Swenson; Thomas J. Boyd, Jr., all of Los Alamos, N. Mex.

[73] Assignee: The United States of America as represented by the United States Department of Energy, Washington, D.C.

[21] Appl. No.: 102,804

[22] Filed: Dec. 12, 1979

[51] Int. Cl.³ .................................................. H01S 3/09
[52] U.S. Cl. .......................................... 372/2; 372/69
[58] Field of Search ....................... 331/94.5 D, 94.5 L, 331/94.5 P, 94.5 G

[56] References Cited

PUBLICATIONS

"Subnanosecond High-Intensity Beam Pulse", Mavrogenes et al., IEEE Trans. Nuc. Sci. NS-20, 919-922, (1973).
"Experimental and Calculated RF Properties of the Disk-and-Washer Structure", Potter et al., IEEE Trans. Nuc. Sc. NS-26 3763, (1979).
"Beam Tests With S-Band Standing Wave Accelerators Using On-Axis Couplers", Schriber et al., Proc. 1972 Proton Lin. Accer. Conf., Oct. '72.
"The Stanford Two-Mile Accelerator", Neal, (Benjamin Inc., N.Y., '68), Chapter 8, Injector, 241-271.
"Performance of 140 MeV High Current Short Pulse Linac at ORNL", Pering et al., IEEE Trans. Nuc. Sci. NS-16, 1-5, (1969).
"Computer Designed 805 MHz Proton Linac Cavities", Hoyt et al., Rev. Sci. Instrums. 37, 755-762, (1966).
"Coupled Resonator Model for Standing Wave Accelerator Tanks", Nagel et al., Rev. Sci. Instrum. 38, 1583-1587, (1967).
"Standing Wave High Energy Linear Accelerator Structures", Knapp et al., Rev. Sci. Instrum. 39, 979-991, (1968).
"High Energy Accelerating Structures For High Gradient Proton Linac Applications", Manca et al., IEEE Trans. Nuc. Sci., NS-24, 1087-1090, ('77).
"First Operation of a Free Electron Laser", Deacon et al., Phys. Rev. Lett. 38, 892-894, (1977).
"High Power Free-Electron Laser Based on Stimulated Raman Back-Scattering", McDermott et al., Phys. Rev. Lett. 41, 1368-1371, (1978).
"High Power CW Efficient Tunable (uv-IR) Free-Electron Laser Using Low-Energy Electron Beams", Elias Phys. Rev. Lett. 42, 977-981, ('79).
"Klystrons and Microvave Triodes", Hamilton et al., McGraw-Hill Book Co., Inc., N.Y., 1948.

Primary Examiner—William L. Sikes
Assistant Examiner—Léon Scott, Jr.
Attorney, Agent, or Firm—William W. Cochran, II; Richard G. Besha; James E. Denny

[57] ABSTRACT

A catalac free electron laser using a rf linac (catalac) which acts as a catalyst to accelerate an electron beam in an initial pass through the catalac and decelerate the electron beam during a second pass through the catalac. During the second pass through the catalac, energy is extracted from the electron beam and transformed to energy of the accelerating fields of the catalac to increase efficiency of the device. Various embodiments disclose the use of post linacs to add electron beam energy extracted by the wiggler and the use of supplementary catalacs to extract energy at various energy peaks produced by the free electron laser wiggler to further enhance efficiency of the catalac free electron laser. The catalac free electron laser can be used in conjunction with a simple resonator, a ring resonator or as an amplifier in conjunction with a master oscillator laser.

16 Claims, 16 Drawing Figures

STORAGE RING DEVICE rf ACCELERATOR/DECELERATOR ENERGY RECOVERY DEVICE

SINGLE PASS DEVICE dc RECOVERY DEVICE

CATALAC FREE ELECTRON LASER

This invention is a result of a contract with the U.S. Department of Energy (contract W-7405-ENG-36).

BACKGROUND OF THE INVENTION

The present invention pertains generally to lasers and more particularly to free electron lasers.

DESCRIPTION OF THE BACKGROUND

Since the concept of the first laser was demonstrated, the scientific community has had great interest in the development of a high power laser which can be continuously tuned over a wide range of frequencies. A high power laser which could be tuned in this manner would have great utility for industrial chemistry applications to supply energy to specific reactions. For example, such a laser could be used as a source to clean exhaust gases from combustion by selectively decomposing noxious substances, or purify the feed stocks for chemical processes by selective destruction of contaminants, such as impurities which would adversely affect catalysts used in the coal gasification process.

With the advent of the gaseous molecular laser, high powers were achievable. However, gaseous molecular lasers are incapable of being continuously tuned over more than a very restricted range of frequencies, and produce only a specific set of frequencies which depend upon the gaseous lasing medium.

The concept of extracting coherent optical radiation from a stream of relativistic electrons, i.e., the "free electron laser", was first described by J. M. J. Madey of Stanford in 1971. J. M. J. Madey et al. later reported lasing action from stimulated bremsstrahlung from the Stanford Linear Accelerator as reported in Phys. Rev. Letts., 38 892 (1977). A collaborative effort by the Columbia University Laboratory and the Naval Research Laboratory has produced a laser based on stimulated Raman scattering by free electrons as reported by D. B. McDermott et al., Phys. Rev. Letts., 41 1368 (1978). The report of these results of the "free electron laser" has caused much excitement in the scientific community since it is possible that free electron lasers will be able to produce exceedingly high powers at low cost and continuously tunable frequency.

In addition to the continuously tunable frequency and potentially high output powers obtainable from the free electron laser, the free electron laser has the added advantage of the absence of a lasing medium, such as a fluid, gas, or solid, which tend to limit power and optical resolution by both linear and nonlinear optical distortion effects in the lasing medium.

Also, flow systems and power to pump the gaseous molecular lasing medium of the gaseous and liquid molecular lasers is avoided.

Other applications for high power free electron lasers include military applications for shipboard use, and local defense against cruise missiles, submarine communication and detection, power transmission to satellites and possibly even propulsion for maneuvering in space. Industrial laser applications referred to above also include laser isotope separation, laser machining, and possible power transmission from solar space stations to earth.

To date, however, only low efficiencies have been demonstrated or envisioned from the various free electron laser systems proposed for producing wavelengths shorter than the near ir. The d.c. accelerator/decelerator concept described by L. R. Elias, Phys. Rev. Letts. 42, 977 (1979) achieves high efficiencies at longer wavelengths (e.g. $\lambda \gtrsim 10$ $\mu$m).

Consequently, tremendous input energy and capital expenditure is required to operate free electron lasers at short wavelengths (e.g. $\lesssim 1$ $\mu$m) and high output powers, necessarily affecting utilization of the free electron laser for the various applications set forth above, since many of these applications require shorter wavelengths for operation.

It is therefore an object of the present invention to provide an improved free electron laser.

It is also an object of the present invention to provide a high efficiency free electron laser.

Another object of the present invention is to provide a free electron laser which is reliable in operation.

Another object of the present invention is to provide a free electron laser capable of producing high output powers at high efficiencies at wavelengths shorter than the near ir.

Another object of the present invention is to provide an improved electron beam power system for a free electron laser.

Other objects, advantages and novel features of the present invention will become apparent to those skilled in the art upon examination of the following detailed description of the preferred embodiment of the invention and the accompanying drawings.

SUMMARY OF THE INVENTION

The present invention overcomes the disadvantages and limitations of the prior art by providing an improved free electron laser and an improved electron beam power system for a free electron laser.

The free electron laser of the present invention comprises means for producing an electron beam, wiggler means for inducing transverse oscillations in the electron beam, means for directing the electron beam in a closed loop, and accelerator/decelerator means (catalac) for accelerating the electron beam in an initial pass through the accelerator/decelerator means and decelerating the electron beam in a second pass through the accelerator/decelerator means to extract energy from the electron beam and transform the energy to accelerating fields of the accelerator/decelerator means.

Additionally, the electron beam power system for use with the free electron laser, having a wiggler for extracting energy from a beam of electrons at a predetermined energy level to produce coherent radiation, comprises means for producing the beam of electrons, means for directing the beam of electrons in a closed loop, and accelerator/decelerator means (catalac) for accelerating the beam of electrons to the predetermined energy level for application to the wiggler and decelerating the beam of electrons emerging from the wiggler to extract energy from the beam of electrons and transform the energy to accelerating fields of the accelerator/decelerator means.

The advantage of the present invention is that coherent optical radiation can be produced at wavelengths shorter than the near ir in a free electron laser which can be continuously tuned over a wide range of frequencies. The present invention produces high output power at an economical cost in a device using rf accelerator technology which is well developed and reliable in operation.

DETAILED DESCRIPTION OF THE PREFERRED EMBODIMENT OF THE INVENTION

Figure 1:
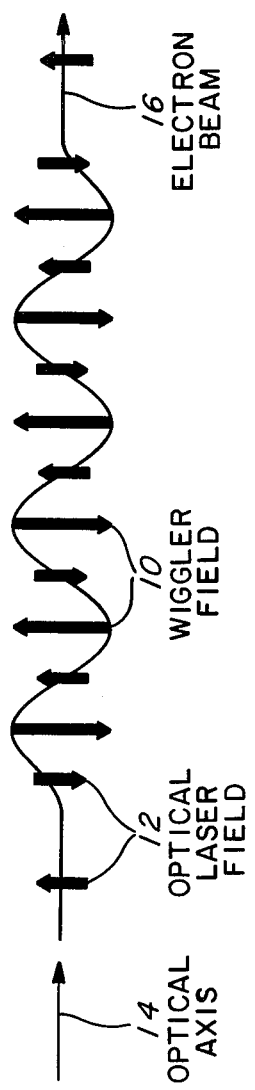
FIG. 1 is a schematic diagram illustrating the interaction region of the free electron laser.

FIG. 1 illustrates the free electron laser interaction region which produces and amplifies coherent radiation in accordance with the present invention. Wiggler field 10 is a spatially oscillating static magnetic field which is produced by a wiggler such as disclosed in U.S. Pat. No. 3,822,410, entitled "Stimulated Emission of Radiation in Periodically Deflected Electron Beams" issued July 2, 1974, Madey et al. The optical laser field 12 is transverse to the optical axis 14 as shown in FIG. 1. In order for the optical laser field 12 to interact with electron beam 16 and consequently do work on the electron beam 16, electrons of electron beam 16 must have a velocity component perpendicular to the optical axis. Wiggler field 10 establishes an alternating periodic magnetic field to induce ripples in the electron beam 16 as it passes through the wiggler, thereby inducing transverse velocity in the electron beam 16, allowing interaction of optical laser field 12 with electrons of electron beam 16. As a consequence of this interaction, some of the electrons of electron beam 16 are accelerated by the interaction of the electron beam 16 with the optical laser field 12, while some are decelerated, depending upon initial phase of the electrons in the optical field 12. This acceleration and deceleration of electrons causes electrons of the electron beam 16 to form into bunches. As the bunches of electrons oscillate in the wiggler field 10, the bunches become phased with respect to the optical field in such a way that the optical field decelerates the bunches to extract energy. Phasing occurs when the optical wavelength, the electron energy, and the wiggler field and period are properly adjusted. The spatial period of the wiggler producing wiggler field 10 and the energy of electrons of electron beam 16 determine the frequency of optical coherent radiation produced by the free electron laser. The nominal relationship between the wiggler wave number ($k_w$) and the optical (signal) wave number ($k_s$) is:

$$k_w = k_s (1 + e^2 B^2/m^2 c^2)/2\gamma^2$$

where:
- $c$ = speed of light
- $m$ = rest mass of the electron
- $e$ = electronic change
- $B$ = magnetic field of the wiggler
- $\gamma$ = relativistic mass factor which is called the resonance condition. An electron beam moving through a wiggler of uniform wave number $k_w$ and magnetic field B and satisfying the resonance condition, will not emit any radiation, but will bunch at the optical wavelength. If the wiggler number is slightly lower than the resonance condition, the electron beam will both bunch and radiate, thereby increasing the energy of the radiation field. An exemplary helical coil wiggler for producing the rippled wiggler magnetic field 10 is disclosed by D. A. G. Deacon et al., Phys. Rev. Letts., 38 892, (1977). Additionally, a set of conducting rings which create a ripple in a solenoidal field for producing the wiggler field 10 is disclosed by D. B. McDermott et al., Phys. Rev. letts., 41 1368 (1978). Also, a suitable arrangement of permanent magnets is capable of producing a wiggler field 10.

Figure 2:
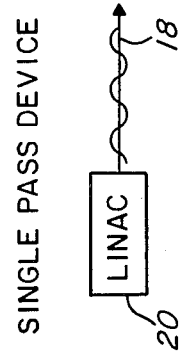
FIG. 2 is a schematic diagram illustrating a single pass free electron laser device.

FIG. 2 schematically illustrates a single pass free electron laser device wherein electron beam 18 is accelerated in linac 20, or other accelerator device, and applied to a wiggler where a fraction of the electron beam energy is extracted as laser energy. Since the extraction efficiency of laser energy by the wiggler is low, the overall efficiency of the single pass device, shown in FIG. 2, is even a lower value. Since the overall system cost is dependent upon input power, the approach illustrated in FIG. 2 is costly to achieve high output laser power, despite its simplicity.

Figure 3:
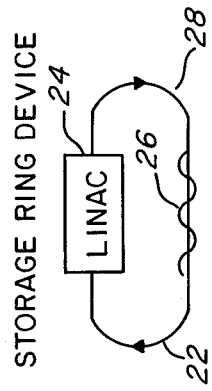
FIG. 3 is a schematic diagram illustrating a storage ring free electron laser device.

FIG. 3 schematically illustrates a storage ring device, which makes use of energy remaining in the electron beam 22 emerging from wiggler 26, by reaccelerating electron beam 22 in linac 24 by an amount equal to the energy extracted by the wiggler. This is accomplished by reinserting electron beam 22, emerging from wiggler 26, into the input of linac 24 for acceleration. The disadvantage of the storage ring device illustrated in FIG. 3 is that momentum distribution in the electron beam is broadened by the free electron laser wiggler. That is, some electrons are decelerated more than others depending upon their phase with respect to the laser field. This broadening of momentum distribution must then be damped by synchrotron radiation elsewhere in the recirculating ring 28 before the electron beam 22 can be reaccelerated and reused in the free electron laser wiggler. The complexity of a suitable storage ring would require extensive capital investment and, in any event, the synchrotron losses required for beam narrowing would significantly decrease overall efficiency values which could eventually be obtained.

Figure 4:
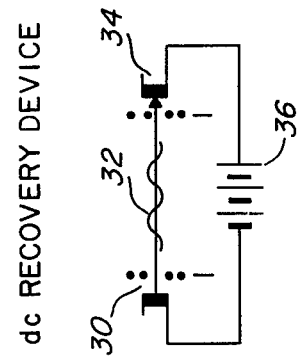
FIG. 4 is a schematic diagram illustrating a d.c. recovery free electron laser device.

FIG. 4 illustrates a d.c. recovery device which avoids problems of degradation of electron beam quality by using a d.c. electric feedback system such as described by L. R. Elias as set forth infra. Energy recovery is accomplished with a d.c. accelerator by using a back biased collector to decelerate the electron beam after it traverses the wiggler. Only a small power supply is needed to return the current to the original high potential. However, the d.c. recovery device approach illustrated in FIG. 4 is limited to a low electron beam energy and consequently longer laser wavelengths, i.e., $\lambda \gtrsim 10$ $\mu m$.

Figure 5:
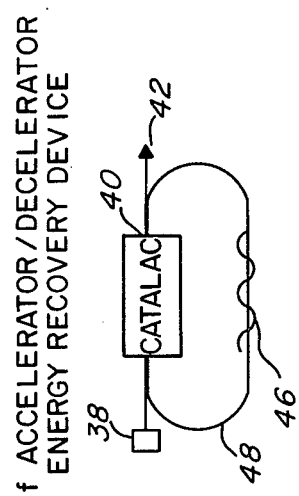
FIG. 5 is a schematic diagram of a racetrack rf accelerator/decelerator energy recovery device (catalac) illustrating the concept of the present invention.

FIG. 5 illustrates the rf accelerator/decelerator energy recovery device concept utilized in accordance with the present invention. The primary components illustrating the concept of the present invention comprise an injector 38, a catalac (catalytic linac) 40 and a wiggler 46. Beam transport mechanisms direct the electron beam produced by the injector 38 in a closed loop through catalac 40. Catalac 40 acts as a catalyst in that it establishes the conditions in the electron beam necessary for lasing action in the catalac free electron laser without itself suffering from net beam loading, hence the name CATALAC (catalytic linac).

In operation, injector 38 produces an electron beam 41 which is accelerated during an initial pass through catalac 40. The electron beam is then directed through wiggler 46 which extracts laser energy. The electron beam 48 emerging from wiggler 46 is directed through catalac 40, out of phase with accelerating fields of catalac 40, so that energy is extracted from electron beam 48 and transformed to energy of the accelerating fields of catalac 40 to accelerate electron beam 41. Decelerated electrons of electron beam 48 are then dumped in a beam dump 42. Problems of electron beam energy spread encountered in the storage ring device of FIG. 3 are therefore avoided by the present invention since the electrons are not being reused as they are in the device of FIG. 3.

Figure 6:
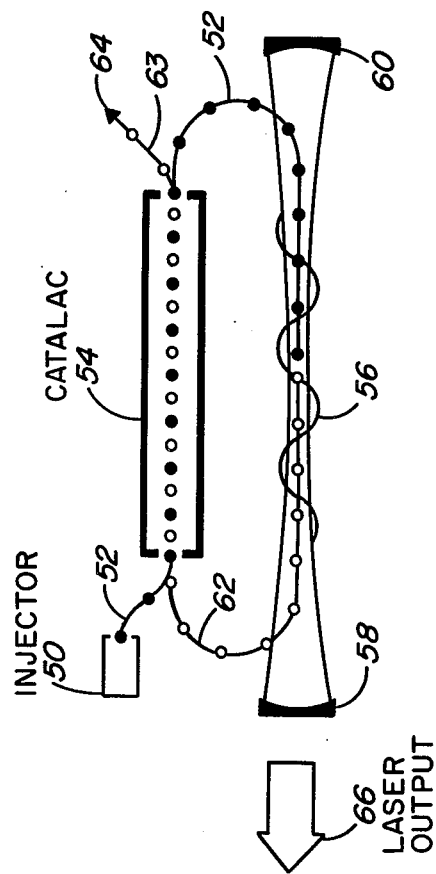
FIG. 6 is a schematic diagram illustrating the concept of operation of the free electron laser comprising the preferred embodiment of the invention.

FIG. 6 illustrates, in more detail, the operation of the rf accelerator/decelerator energy recovery device shown in FIG. 5, otherwise known as the catalac free electron laser comprising the present invention. The present invention uses an rf linac system in which radio-frequency fields, such as microwave fields, are applied to resonant cavities to accelerate the electron beam. The technology of rf linac systems is well developed and such systems have demonstrated high efficiency and high reliability. For purposes of illustration, a 1 $\mu m$ wavelength free electron laser will be summarized using appropriate parameters.

As illustrated in FIG. 6, an injector 50 produces a 2 MeV electron beam 52 which is inserted via conventional mechanisms, into catalac 54. Catalac 54 comprises any number of conventional rf driven accelerators such as disclosed in "Computer Designed 905 MHz Proton Linac Cavities" by Harry C. Hoyt et al., disclosed in the Rev. of Sci. Instrums., Vol. 37, n. 6, pp. 755-762, June 1966, "Coupled Resonator Model for Standing Wave Accelerator Tanks" by D. E. Nagle et al., Rev. of Sci. Instrums., Vol. 38, n. 11, pp. 1538-1587, November 1967, and "Standing Wave High Energy Linear Accelerator Structures" by E. A. Knapp et al., Rev. of Sci. Instrums., Vol. 38, n. 7, pp 979-991, July 1968, or, the disk and washer structure as disclosed in "High Energy Accelerator Structures for High Gradient Proton Linac Applications" by J. J. Manca et al., IEEE Transactions on Nuclear Science, Vol. NS 24, n. 3, June 1977 and "Experimental and Calculated RF Properties of the Disk and Washer Structure" by J. M. Potter et al., IEEE Transactions on Nuclear Science, Vol. NS 26, n. 3, June 1979. Of course, any suitable rf accelerator for accelerating multiamp (peak current) electron beams can be used in accordance with the present invention, such as the cavity structure disclosed in the article entitled "Beam Test With S-Band Standing Wave Accelerators Using On-Axis Couplers" by S. O. Schriber et al. appearing in Proceedings of 1972 Proton Linear Accelerator Conference, Oct. 10-13, 1972.

Injector 50 comprises any suitable injector which produces multiamp currents, such as the injector utilized in the Stanford Linear Accelerator as disclosed in the text "The Stanford Two-Mile Accelerator" by R. B. Neal, W. A. Benjamin Inc., New York 1968 in chapter 8, *Injector* pp. 241-271. Similarly, the injectors disclosed in the articles entitled "Performance of 140 MeV High Current Short Pulse Linac at ORNL" by N. C. Pering et al. appearing in IEEE Transactions on Nuclear Science, Vol. NS 16, n. 3, June 1969 and "Subnanosecond High Intensity Beam Pulse" by G. Mavrogenes et al. appearing in IEEE Transactions on Nuclear Science, Vol. NS 20, n. 3, June 1973, disclose other suitable injectors for use in accordance with the present invention.

Referring again to FIG. 6, electron beam 52 (filled circles) produced by injector 50 is inserted into catalac 52 with a phase relative to the rf accelerating fields which results in acceleration of electron beam 52 in catalac 54 to 100 MeV. Electron beam 52 exiting catalac 54 is then directed, using conventional beam transport systems, through wiggler 56 which is aligned with an optical resonator comprising reflectors 58 and 60. After extraction of energy from electron beam 52, in the manner disclosed in FIG. 1, emerging electron beam 62 (open circles) is directed and reinserted into catalac 54 so that the bunches are roughly 180° out-of-phase with the microwave acceleration fields in catalac 54. This causes electrons of emerging electron beam 62 to be decelerated so as to transform energy of electrons of electron beam 62 to the accelerating fields of catalac 54, which energy is used to accelerate electron beam 52. The low energy, decelerated electrons 63 emerging from the catalac are separated from beam 52 and dumped at 64 by way of an electron spectrometer or other suitable device for separating low energy electrons from high energy electrons, such as disclosed in "Focussing of Charged Particles" edited by Albert Septier, Vol. 2, section 4.2, Academic Press 1967, N.Y.

Figure 7:
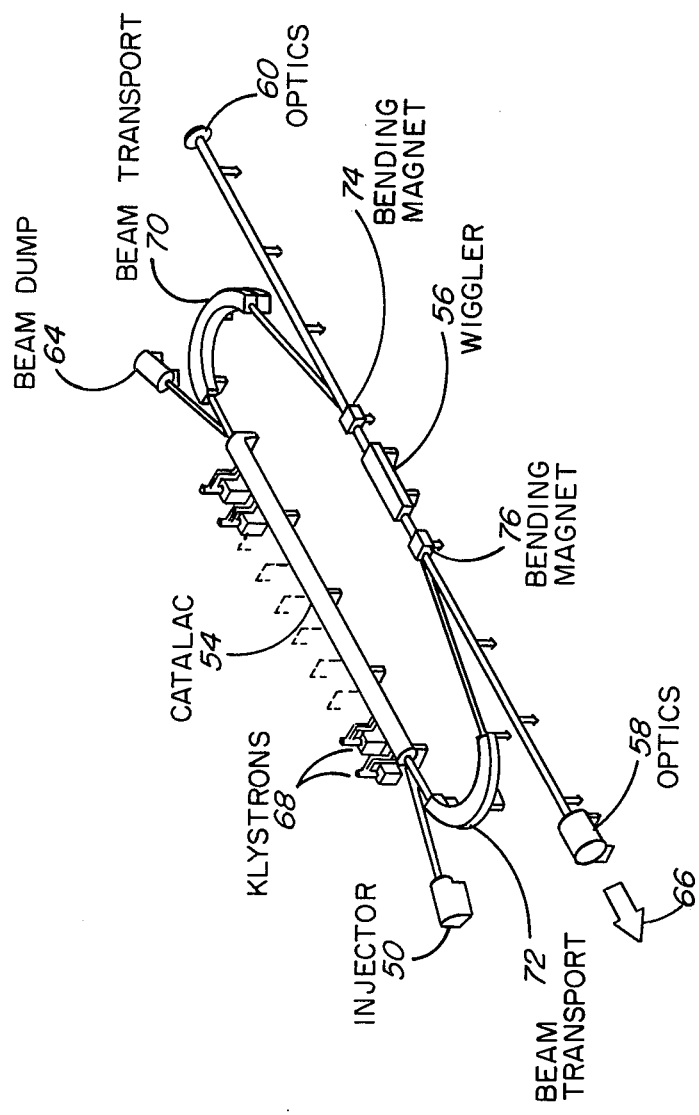
FIg. 7 is a schematic diagram illustrating the components of the catalac free electron laser as illustrated in FIG. 6.

FIG. 7 is a perspective view illustrating the various components of the catalac free electron laser shown in FIG. 6. Klystrons 68 generate microwave rf energy to produce the accelerating and decelerating fields of catalac 54 in the conventional manner as disclosed by the text entitled "Klystrons and Microwave Triodes" by Donald W. Hamilton, Julian R. Knipp, J. B. Horner Kuper, McGraw-Hill Book Company, Inc., New York 1948. Beam transport magnets 70 and 72 guide the electron beam in the closed loop pattern in conjunction with bending magnets 74 and 76.

Figure 8:
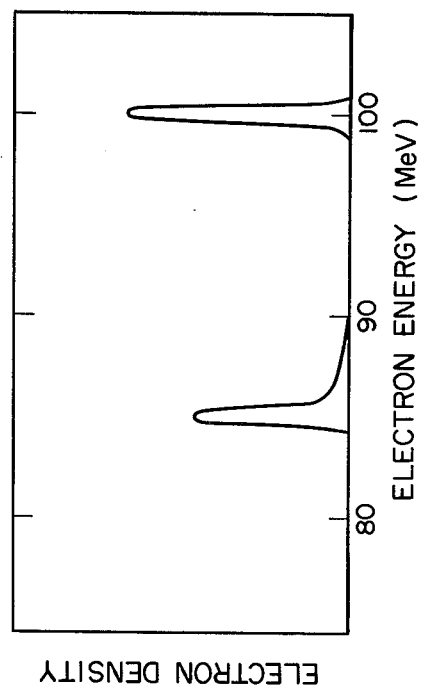
FIG. 8 is a graph of electron density versus electron energy for electrons emerging from an exemplary wiggler for use with the present invention.

FIG. 8 is a graph illustrating electron density versus electron energy for electrons emerging from a typical tapered wiggler for use in the present invention. According to the concept of the tapered wiggler, the wiggler wave number and wiggler field are varied in such a way as to "trap" a significant number of electrons in a potential well and decelerate them coherently. This is achieved by using a wiggler which has a decreasing spatial period wherein the distance in each successive magnetic field is "tuned" to the energy of the electron exiting the preceding magnetic field. Since each set of magnetic field lines extracts energy from the electrons, successively shorter spatial periods of the magnetic fields are used to coherently decelerate the electrons in the "tapered wiggler." Such a tapered wiggler is capable of extracting 5% or more of the energy of the beam. Moreover, the distribution function of electrons emerging from the wiggler is compatible with the catalac decelerator since distinct peaks of energy are produced, such as shown in FIG. 8. In other words, the emergent beam distribution function illustrated in FIG. 8 is dominated by two peaks which represent a first group of electrons (100 MeV peak) which are passed through the wiggler relatively unaffected and a second group of electrons (85 MeV peak) which have been "trapped" and strongly decelerated in the moving force field created by the laser and the tapered wiggler, as disclosed above.

Figure 9:
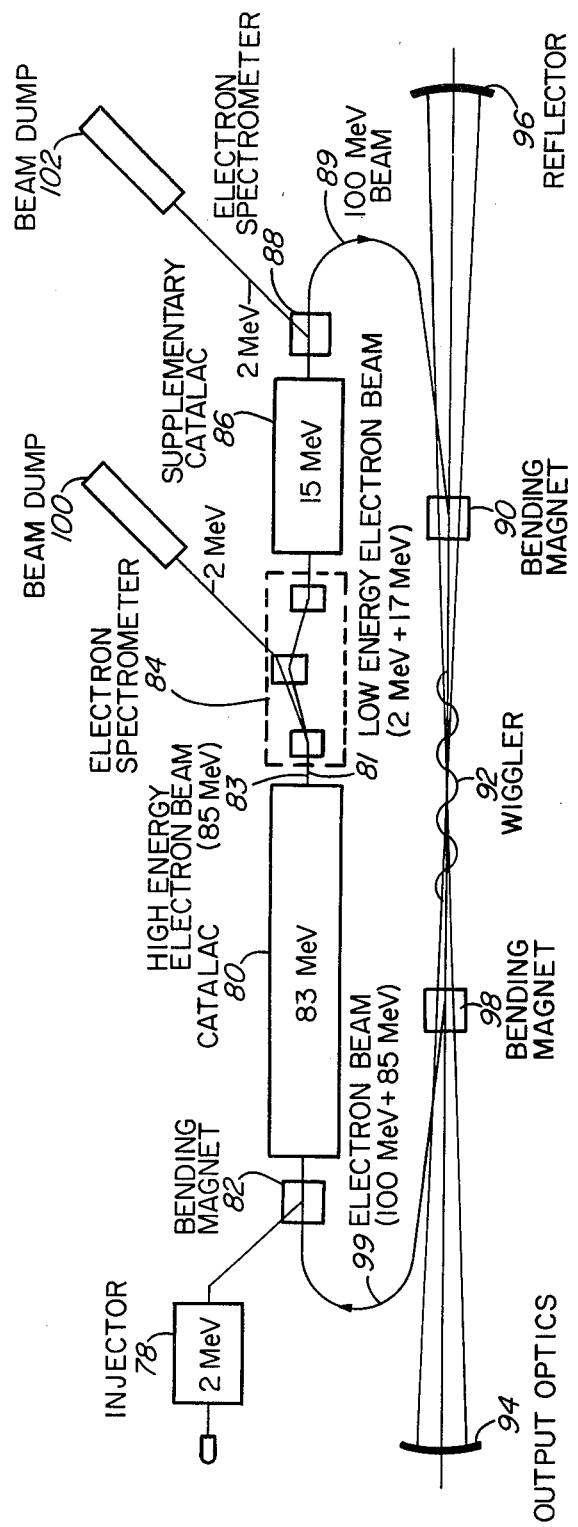
FIG. 9 is a schematic diagram of a catalac free electron laser using a supplementary catalac.

FIG. 9 discloses an arrangement, in accordance with the preferred embodiment of the invention, to extract a maximum amount of energy from the energy distribution function illustrated in FIG. 8. Injector 78 produces a low energy beam, e.g., 2 MeV, which is injected into catalac 80 via bending magnet 82. Catalac 80 is designed to accelerate the electron beam produced by injector 78 by 83 MeV to produce an output beam 83 at 85 MeV. The 85 MeV beam 83 passes through electron spectrometer 84 and is injected into supplementary catalac 86 which further accelerates the 85 MeV beam 83 to a 100 MeV beam 89. The 100 MeV beam 89 then passes through electron spectrometer 88 and is directed via conventional beam transport devices (not shown) to bending magnet 90 which directs the electron beam 89 through wiggler 92 disposed within the interaction region. Output optics 94 and reflector 96 feed back coherent radiation through the interaction region for amplification.

The electron beam 99 exiting wiggler 92 has an electron energy distribution such as shown in FIG. 8. The electron beam 99 is directed through bending magnet 98 and conventional beam transport devices (not shown) to the input of catalac 80. The electron beam 99 emerging from wiggler 92, having the electron energy distribution shown in FIG. 8, is injected into catalac 80 such that the bunches are approximately 180° out-of-phase with the accelerating fields of catalac 80. Catalac 80 extracts 83 MeV from the 100 MeV and 85 MeV electron energy distribution peaks of electron beam 99 to produce 17 MeV and 2 MeV peaks in the electron beam 81 exiting catalac 80. The energy extracted from the electron beam 99 is transformed directly into energy of the accelerating fields of catalac 80. Consequently, the combined electron beam 81 and 83 exiting catalac 80 has a high energy peak at 85 MeV from the accelerated 2 MeV beam from injector 78, and low energy peaks at 17 MeV and 2 MeV.

Electron spectrometer 84 separates the 2 MeV peak which is dumped in beam dump 100. The remaining electron beam has peaks at 85 MeV and 17 MeV. The 85 MeV peak is accelerated to 100 MeV in supplementary catalac 86, as disclosed above, while the 17 MeV peak is applied to the supplementary catalac 86 such that the electron bunches are roughly 180° out-of-phase with the accelerating fields of supplementary catalac 86. As a result, 15 MeV is extracted from the 17 MeV peak to produce a 2 MeV peak beam which is separated by electron spectrometer 88 and dumped in beam dump 102. The remaining electron beam 89 exiting electron spectrometer 88 has a single peak at 100 MeV. The energy extracted from the 17 MeV peak in supplementary catalac 86 is transformed directly into energy of the accelerating fields of supplementary catalac 86.

The arrangement of FIG. 9 therefore provides a device for extracting energy from two sepatate electron energy distribution peaks of the electron beam 99 emerging from wiggler 92. The only important losses in the system are the 2 MeV beams applied to beam dumps 100 and 102 and dissipative losses in the accelerator structures. Additionally, the electrons which have passed through wiggler 92 are not reused in the manner they are used in the storage ring device of FIG. 3, but rather, are decelerated in catalac 80 and supplementary catalac 86 and are dumped in beam dumps 100 and 102. This eliminates many problems of energy spread in the electron beam applied to the wiggler 92.

Typical parameters for a CW system such as illustrated in FIG. 9 are summarized below.

| | |
|---|---|
| Wavelength | 1 μm |
| Micropulse length | 85 ps |
| Micropulse repetition time | 14 ns |
| Peak power | 1.5 GW |
| Peak intensity | 50 GW/cm$^2$ |
| Saturated gain per pass | 100% |
| Initial mean electron energy | 100 MeV |
| Final mean electron energy | 94 MeV |
| Extraction efficiency | 6% |
| Final trapped electron energy | 85 MeV |
| Trapping fraction | 40% |
| Maximum acceptable energy spread for trapping | 0.89% |
| Wiggler length | 16 m |
| Wiggler period | 4–2.9 cm |
| Magnetic induction (rms) | 2.7–3.7 kG |
| Mirror reflectivity | 99% |
| Average thermal load on mirrors | 2 kW/cm$^2$ |
| Accelerator frequency | 358 MHz |
| Acceleration in injector CATALAC | 2 MeV |
| Acceleration (deceleration) in POLAC (Supplementary CATALAC) | 15 MeV |
| Total acceleration | 100 MeV |
| Peak current | 250A |
| Microbunch length | 85 ps (11.5°) |
| Injection subharmonic | 5 |
| Electron beam diameter | 1.4 mm |
| Energy spread | 0.5% |
| Emittance | 0.4π mm-mrad |
| Equivalent energy spread due to emittance | 0.44% |
| Effective total energy spread | 0.67% |
| Electron energy at dump | 2 MeV |
| rf-to-laser efficiency | 63% |
| Klystron efficiency | 65% |
| dc-to-laser effeciency | 41% |

Figure 10:
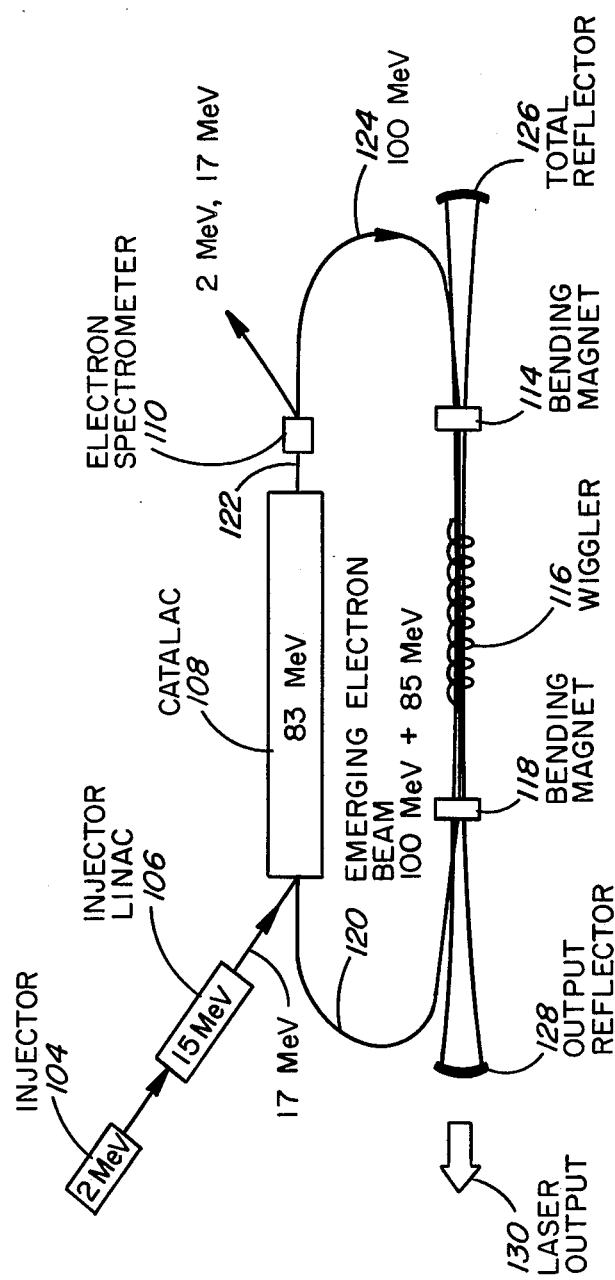
FIG. 10 is a schematic diagram of a catalac free electron laser using an injector linac in accordance with the preferred embodiment of the invention.

FIG. 10 illustrates a design which is, perhaps, simpler in operation but is somewhat less efficient than the system disclosed in FIG. 9. As shown in FIG. 10, an injector 104 produces a 2 MeV beam which is then applied to an injector linac 106 which accelerates the injector beam to 17 MeV. The 17 MeV beam is applied to catalac 108 which accelerates the beam to 100 MeV. The 100 MeV beam passes through electron spectrometer 110 and is directed through bending magnet 114 to the interaction region where wiggler 116 is disposed. Wiggler 116 extracts energy from the 100 MeV electron beam and produces an electron energy distribution function, such as shown in FIG. 8, having peaks at 100 MeV and 85 MeV. The emerging electron beam is then directed via bending magnet 118 to the input of catalac 108. The emerging electron beam 120 is applied to catalac 108 such that electron bunches are 180° out-of-phase with accelerating fields in catalac 108. Catalac 108 extracts 83 MeV from the 100 MeV and 85 MeV peaks to produce an output beam having peaks at 2 MeV and 17 MeV. Again, energy extracted from the emerging electron beam 120 is transformed directly to energy to the accelerating fields of catalac 108. The 2 MeV and 17 MeV peaks are then extracted from the electron beam 122 via electron spectrometer 110. An optical resonator formed by output reflector 128 and total reflector 126 provides optical feedback for amplification to produce laser output 130. The overall efficiency of this device, based on the calculations and figures for the device described above, is 21%. Optimization of the parameters would produce a higher efficiency.

Figure 11:
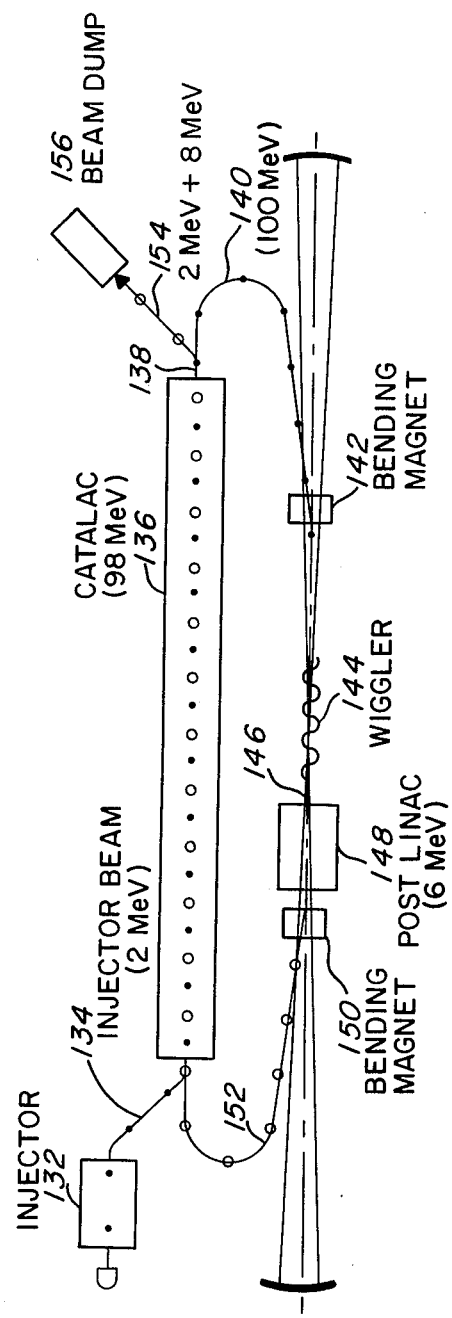
FIG. 11 is a schematic diagram of a catalac free electron laser utilizing a post linac.

FIG. 11 discloses an alternative arrangement in accordance with the present invention. As shown in FIG. 11, injector 132 applies an electron beam 134 at an energy level of 2 MeV to catalac 136. Catalac 136 accelerates beam 134 to 100 MeV to produce electron beam 140 at 100 MeV. Bending magnet 142 directs electron beam 140 through wiggler 144 which is designed to extract up to 6 MeV from electron beam 140 to produce electron beam 146. Electron beam 146 is applied to post linac 148 which accelerates electron beam 146 by 6 MeV. Since the electron beam 146 has two electron density peaks at approximately 94 MeV and 100 MeV, electron beam 152 has two peaks at approximately 100 MeV and 106 MeV. Electron beam 152 is then injected in catalac 136 at roughly 180° out-of-phase with accelerating fields so that 98 MeV is extracted to produce two peaks at approximately 2 MeV and 8 MeV. Consequently, the electron beam 138 exiting catalac 136 has peaks at approximately 2 MeV, 8 MeV and 100 MeV. An electron spectrometer (not shown) separates the low energy electrons having energy distribution peaks at approximately 2 MeV and 8 MeV from the 100 MeV electrons of electron beam 140 and directs the electron beam 154 into beam dump 156.

Figure 12:
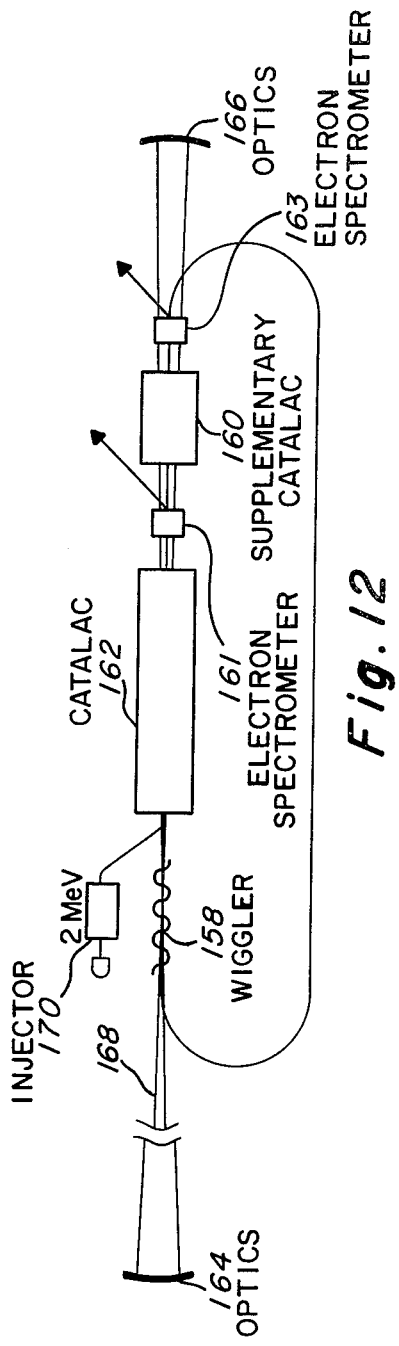
FIG. 12 is a schematic diagram of a catalac free electron laser utilizing a catalac and a supplementary catalac disposed in line with the laser beam.

FIG. 12 discloses alternative arrangement of elements wherein the wiggler 158, supplementary catalac 160 and catalac 162 are in line with the optical axis of the optical resonator comprising optics 164 and optics 166. Again, the same parameters used in the device of FIG. 9 are applicable to the device of FIG. 12. The advantage of the device of FIG. 12 is that the arrangement of the wiggler in line with the catalac 162 and supplementary catalac 160 obviates the need for an achromatic and isochronous beam transport system between the wiggler 158 and catalac 162. An achromatic and isochronous beam transport system is required due to the angular divergence and energy spread produced in the electron beam by the wiggler in the device of FIG. 9. The engineering difficulties of such a beam transport, due to divergence introduced by such a system as a result of electrons at different energy levels and previous angular divergence introduced in these electrons by the wiggler 158, are overcome by the device of FIG. 12. However, the disadvantage of the arrangement of FIG. 12 is that it requires the projection of the optical beam 168 through catalac 162 and supplementary catalac 160.

Figure 13:
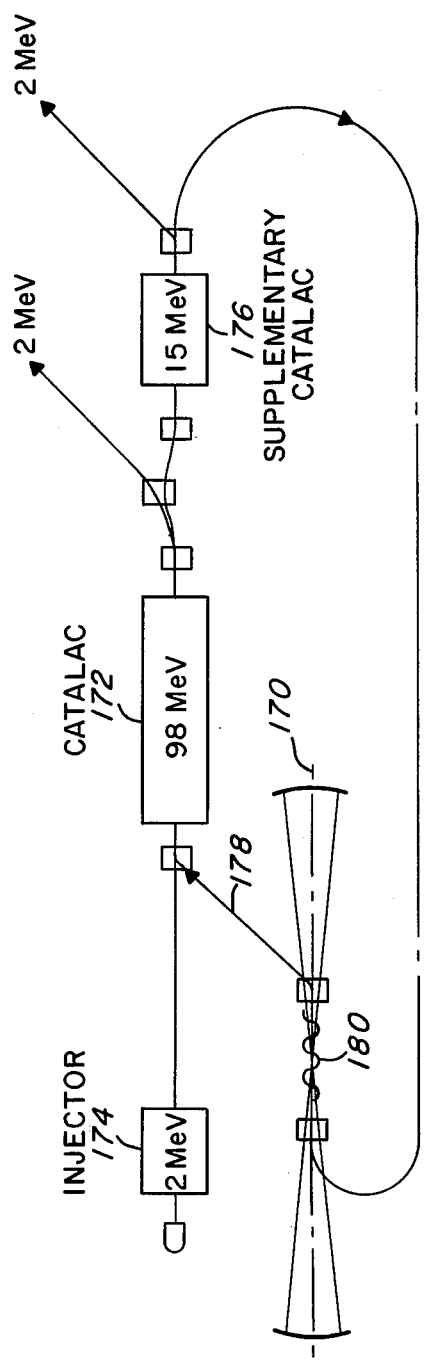
FIG. 13 is a schematic diagram of a catalac free electron laser utilizing a supplementary catalac and an offset wiggler configuration.

FIG. 13 shows an alternate arrangement wherein the optical axis 170 of the optical resonator is off-set from catalac 172. FIG. 13 is similar to FIG. 9 and can be designed to use the same parameters as disclosed in FIG. 9. The advantage of the device of FIG. 13 is that problems of beam guidance after the electron beam 178 emerges from wiggler 180, due to angular divergence and energy spread introduced by wiggler 180, are reduced, due to the minimal change in direction of electron beam 178.

Figure 14:
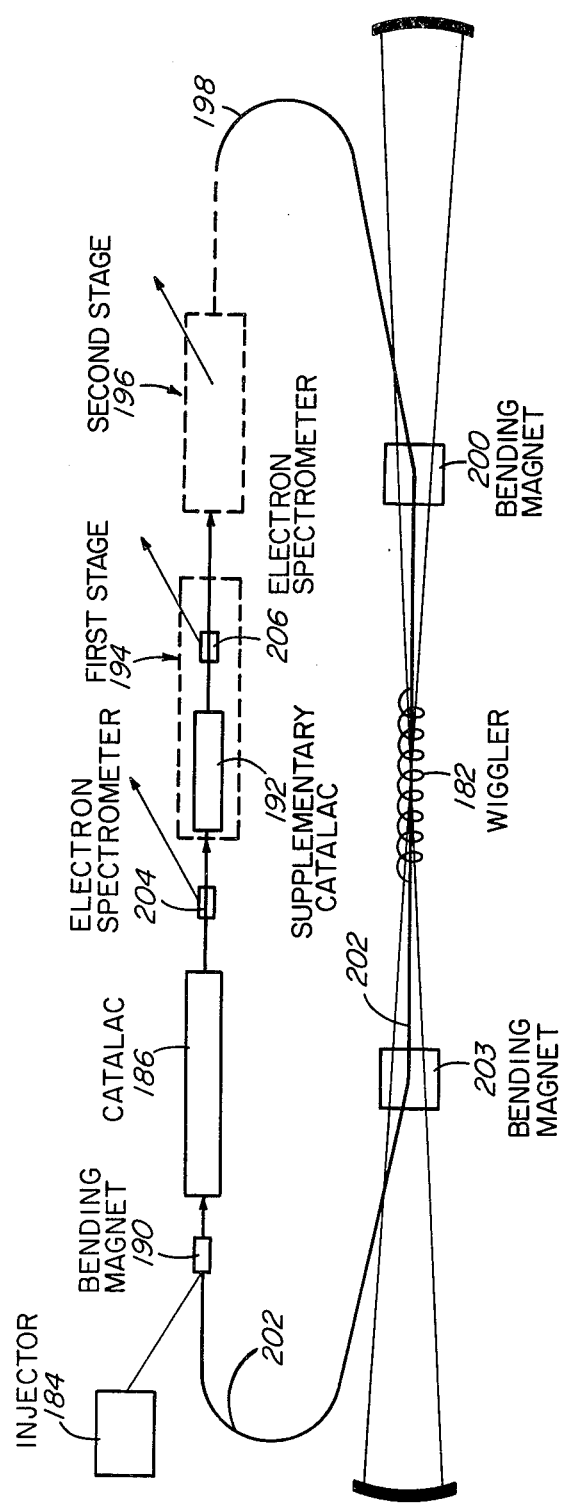
FIG. 14 is a schematic illustration of a catalac free electron laser illustrating the use of numerous stages of supplementary catalacs to extract numerous levels of electron beam energy.

FIG. 14 illustrates a catalac free electron laser, in accordance with the present invention, similar to the device in FIG. 9 with the exception that additional stages of supplementary catalacs are added to further extract energy from a more complex energy distribution produced by wiggler 182. In operation, injector 184 produces a low energy electron beam which is directed into catalac 186 via bending magnet 190. The electron beam is then accelerated in catalac 186 and in a series of supplementary catalacs, such as supplementary catalac 192, contained within a series of stages, such as first stage 194, second stage 196, and so forth, to a predetermined energy level to produce electron beam 198. Electron beam 198 is then applied to wiggler 182 via bending magnet 200. The emerging electron beam 202 is applied to the input of catalac 186 via bending magnet 203 and an achromatic, isochronous beam transport system (not shown). Catalac 186 and successive supplementary catalacs contained within the plurality of successive stages extract predetermined amounts of energy from the various energy levels of electrons of electron beam 202. A plurality of electron spectrometers, such as electron spectrometers 204 and 206, dump the low energy electrons after sufficient energy is extracted from them so that they cannot pass through the supplementary catalacs further. Again, recovered energy is used to accelerate the electron beam produced by injector 184.

Figure 15:
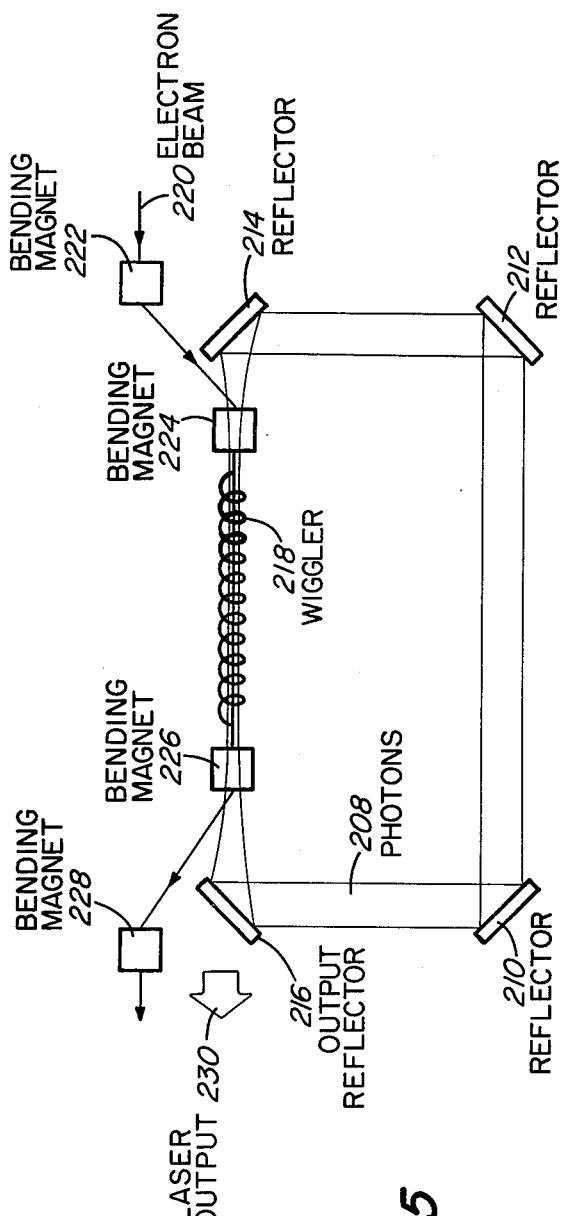
FIG. 15 is a schematic diagram of a ring resonator.

FIG. 15 illustrates a ring resonator for use with the various embodiments disclosed in FIGS. 5–7 and 9–14. Since amplification of coherent light is accomplished only when photons of the resonator are traveling in same direction as the electron beam, it is often advantageous to use a ring resonator, such as illustrated in FIG. 15, wherein photons 208 are directed in a closed loop circular pattern via reflectors 210, 212, 214 and 216 so they pass through the wiggler 218 only in the direction of the electron beam 220. The electron beam 220 is directed via bending magnets 222 and 224 through wiggler 218 and then via bending magnets 226 and 228 so as to continue in the closed loop pattern disclosed above. Output reflector 216 produces laser output 230 which is directed along the optical axis of the wiggler 218. Of course, output reflector 216 can be disposed anywhere within the ring resonator illustrated in FIG. 15 to point the output beam in various directions.

Figure 16:
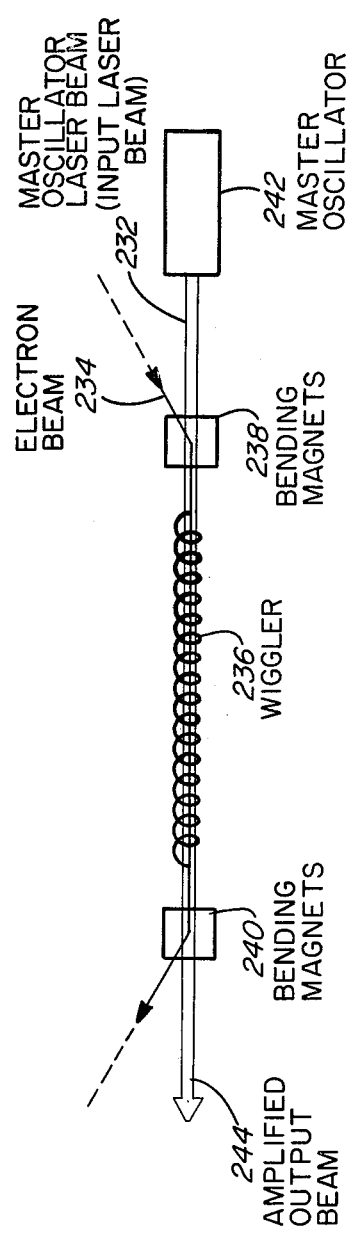
FIG. 16 is a schematic diagram of a configuration utilizing the catalac free electron laser as a laser amplifier for a master oscillator laser.

FIG. 16 illustrates the use of an input laser beam from a master oscillator in conjunction with the catalac free electron laser of the present invention to eliminate the optical resonators illustrated in FIGS. 6, 7 and 9–15, so as to transform the catalac free electron laser oscillator illustrated in FIGS. 6, 7 and 9–15 into a catalac free electron laser amplifier. In operation, electron beam 234 is directed through the wiggler 236 via bending magnets 238 and 240. Master oscillator laser 242 provides an optical signal at a specified frequency at which the free electron laser amplifier is tuned. Upon passing through wiggler 236, the input laser beam 232 is amplified to produce amplified output beam 244. Any desired injection laser 242 can be utilized in this manner, including other free electron laser oscillators, HF lasers, mode-locked neodymium YAG lasers, etc. The tunable nature of the free electron laser provides a wide range of uses for the free electron laser amplifier in conjunction with other lasers including high power gaseous molecular lasers.

The present invention therefore provides a high efficiency free electron laser which relies upon well developed and reliable rf accelerator technology. The catalac free electron laser of the present invention is capable of providing high efficiency at wavelengths shorter than the near ir using an electron beam power system which discards electrons after energy has been extracted from these electrons to eliminate problems such as beam divergence, momentum distribution, etc. encountered in storage ring devices, which seriously degrade the electron beam quality and performance of the free electron laser. The free electron laser of the present invention uses a linic which acts as a catalyst to transform electron energy from electrons emerging from the free-electron laser directly into accelerating field energy to accelerate new electrons, resulting in both high efficiency and simplicity of operation.

The foregoing description of the present invention has been presented for the purposes of illustration and description and it is not intended to be exhaustive or to limit the invention to the precise form and/or parameters disclosed. The foregoing description was chosen and described in order to best explain the principles of the invention in a practical application and to thereby enable others skilled in the art to best utilize the invention and various embodiments and with various modifications as are suited to the particular use contemplated.

For example, the bending magnets and beam transport systems illustrated can comprise a single integrated unit for isochronously and achromatically transporting the beam according to the well known principles of beam transport. Although these elements have been shown schematically in the drawings and in some instances in more detail than others, it should be understood that the manner of bending and transporting the beam is accomplished in accordance with well known principles. It is therefore to be understood that within the scope of the appended claims, the invention may be practiced otherwise than specifically described, and that subject matter disclosed herein shall not be precluded from being later claimed in the present application, a separate application, or a continuation, continuation-in-part, or reissue application.

What is claimed is:

1. A free electron laser for amplifying coherent radiation comprising:
   means for producing a beam of electrons;
   means for accelerating said beam of electrons to a predetermined relativistic energy using rf accelerating fields;
   wiggler means for inducing transverse oscillations in said beam of electrons to amplify said coherent radiation;
   means for directing said beam of electrons emerging from said wiggler into said means for accelerating whereby electrons of said beam of electrons emerging from said wiggler are out-of-phase with said rf accelerating fields so as to transform energy from said electrons into energy of said accelerating fields to increase efficiency of said laser.

2. The free electron laser of claim 1 further comprising:
   an optical resonant cavity aligned with said wiggler means for feeding back said coherent optical radiation generated and amplified in said wiggler means.

3. The free electron laser of claim 1 further comprising:
   means for separating low energy electrons from high energy electrons.

4. The free electron laser of claim 1 wherein said optical resonant cavity comprises a ring resonator.

5. A free electron laser comprising:
   means for producing an electron beam;
   wiggler means for inducing transverse oscillations in said electron beam;
   means for directing said electron beam in a closed loop;
   catalac accelerator/decelerator means for accelerating said electron beam during an initial pass through said catalac accelerator/decelerator means and decelerating said electron beam during a second pass through said catalac accelerator/decelerator means to extract energy from said electron beam and transform said energy to accelerating fields of said catalac accelerator/decelerator means.

6. The free electron laser of claim 5 further comprising:
   optical resonant cavity means aligned with said wiggler means for feeding back coherent optical radiation generated and amplified in said wiggler means.

7. The free electron laser of claim 6 wherein said optical resonant cavity comprises a ring resonator.

8. The free electron laser of claim 5 further comprising:
   an external source of coherent radiation aligned with said wiggler means.

9. The free electron laser of claim 5 further comprising:
   means for separating low energy electrons from high energy electrons.

10. The free electron laser of claim 5 further comprising:
    additional catalac accelerator/decelerator means to further accelerate said electron beam during said initial pass through said catalac accelerator/decelerator means and an initial pass through said additional catalac accelerator/decelerator means and to further extract energy at more than one energy level from said electron beam during said second pass through said catalac accelerator/decelerator means and a second pass through said additional catalac accelerator/decelerator means.

11. In a free electron laser system having a wiggler for extracting energy from a beam of electrons at a predetermined energy level to produce coherent optical radiation, an electron beam power system for said free electron laser system comprising:
    means for producing said beam of electrons;
    rf cavity means for accelerating and decelerating said beam of electrons;
    means for directing said beam of electrons through said rf cavity means to accelerate said beam of electrons to said predetermined energy level and to decelerate said beam of electrons after emerging from said wiggler to extract energy from said beam of electrons and transform said energy to accelerating fields of said rf cavity means;

whereby efficiency of said electron beam power system is enhanced.

12. The electron beam power system of claim 11 further comprising:

means for separating low energy electrons from high energy electrons and eliminating said low energy electrons from said means for directing.

13. The electron beam power system of claim 11 further comprising:

additional rf cavity means for accelerating and decelerating said beam of electrons to further extract energy at more than one energy level from said beam of electrons emerging from said wiggler.

14. In a free electron laser system having a wiggler for extracting energy from a beam of electrons at a predetermined energy level to produce coherent optical radiation, an electron beam power system for said free electron laser comprising:

means for producing said beam of electrons;

means for directing said beam of electrons in a closed loop;

catalac accelerator/decelerator means for accelerating said beam of electrons to said predetermined energy level for application to said wiggler and decelerating said beam of electrons emerging from said wiggler to extract energy from said beam of electrons and transform said energy to accelerating fields of said catalac accelerator/decelerator means.

15. The electron beam power system of claim 13 further comprising:

means for separating low energy electrons from high energy electrons and eliminating said low energy electrons from said means for directing.

16. The electron beam power system of claim 14 further comprising:

additional catalac accelerator/decelerator means to further extract energy at more than one energy level from said beam of electrons emerging from said wiggler.

* * * * *